Sept. 22, 1959 E. P. HOYT 2,905,759
TELEVISION TUNING INDICATOR
Filed Nov. 8, 1955
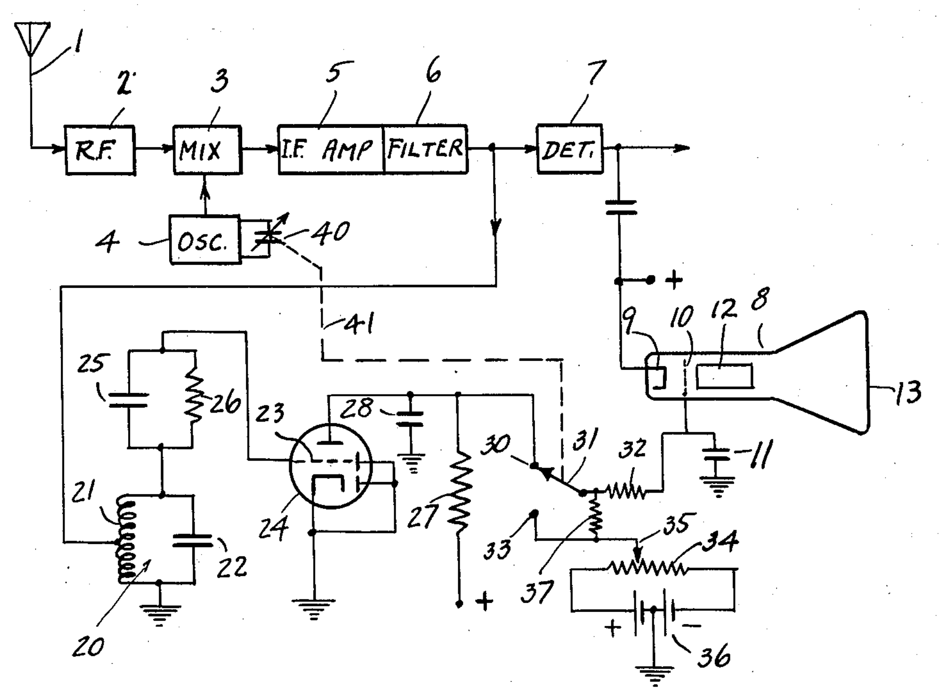
INVENTOR.
EUGENE P. HOYT.
BY
Lockwood, Galt, Woodard & Smith.
ATTORNEYS.

United States Patent Office 2,905,759

Patented Sept. 22, 1959

2,905,759

TELEVISION TUNING INDICATOR

Eugene P. Hoyt, Fort Wayne, Ind., assignor to International Telephone and Telegraph Corporation Application November 8, 1955, Serial No. 545,648

4 Claims. (Cl. 178—7.5)

This invention relates to tuning indicators and is particularly directed to means for reliably indicating correct tuning of the resonant circuits of a receiver by characteristic changes on the face of an illuminated picture tube.

A common tuning indicator system for radio receivers comprises a direct current voltage amplifier connected at its input to the output of the second detector or to the feedback portion of an automatic gain control circuit. The output of the voltage amplifier is applied to an indicator tube of the type commercially known as a tuning "eye."

It has been proposed in the co-pending application of Silvey et al., Serial No. 536,935, filed September 27, 1955, entitled "Tuning Indicators," and assigned to the assignee of this application, now abandoned, to connect a sharply resonant circuit to one of the limit frequencies of the relatievly broad band pass intermediate frequency amplifier and to derive a direct current voltage analogous to the high frequency voltage across the narrow pass filter, this voltage being applied to a tuning indicator device.

The principal object of this invention is to eliminate the tuning indicator device and their attendant circuits and to utilize the illumination on the face of a picture tube as a visual indicator of correct tuning.

The above-mentioned and other features and objects of this invention and the manner of attaining them will become more apparent and the invention itself will be best understood by reference to the following description of an embodiment of the invention taken in conjunction with the accompanying drawing, wherein:

The figure is a wiring diagram of one embodiment of this invention.

The television receiver comprises essentially an input circuit such as an antenna 1 connected if desired into the radio frequency amplifier 2. The amplified signal is combined in mixer 3 with another high frequency generated at the tuneable local oscillator 4. The resulting sum or difference frequency is amplified in the intermediate frequency amplifier 5 which preferably contains fixed resonant circuits of such band pass characteristics as to pass the carrier with its usual range of video and audio modulation. The resonant circuits or filter is represented by 6 in the drawing. The video signal is derived at detector 7 and is applied to one of the input electrodes of the kinescope 8. In the example illustrated, the video signal is applied to the cathode 9 while the control grid 10 is grounded for the signal voltage by condenser 11. The gun structure 12 focuses a beam on the screen 13, which beam scans the screen by magnetic or electrostatic deflection means (not shown). Differences in potential between the input electrodes 9 and 10 register areas of illumination on this screen; that is, video signals of electrodes 9 and 10 are reproduced as picture elements on the screen, whereas average differences in potential between the cathode and grid 9 and 10 determine the average level of illumination on the screen.

This quality of the kinescope to show an average screen illumination in response to an average grid bias is utilized for tuning indication, according to this invention.

A portion of the output current of the IF amplifier and filters 5 and 6 is applied to the resonant circuit 20. Resonant circuit 20 is tuned to peak at a frequency at or near the upper or lower limit frequencies of filter 6, as more fully described in the Silvey application, supra. The particular resonant circuit 20 comprises a tank consisting of parallel inductance 21 and capacity 22, one end of which is grounded and the other end of which is connected to the control grid 23 of the amplifier rectifier tube 24. This coupling may be made through the coupling condenser 25 and the grid leak resistor 26. The particular tube shown at 24 is of the triode-double diode type of which the commercial 6AV6 is an example. Across load resistor 27 appears a direct current component, the amplitude of which is proportional to the high frequency voltage applied at the grid. Bypass condenser 28 is added to eliminate high frequency components of the signal from the output circuit of the tube.

According to an important feature of this invention, the direct current voltage across load resistor 27 is applied to the grid of the kinescope through terminal 30 of the double throw-switch 31. The grid leak resistor 32 is connected between the armature of the switch and the control grid 10. The other terminal 33 of the switch is connected to an adjustable resistance 34 through the adjustable wiper 35, on a control knob commonly termed the brightness control. Across resistance 34 appears a fixed voltage of sufficient value to span the cutoff to full brightness voltage range of the grid-cathode of the kinescope. For convenience, the brightness control voltage is shown as a battery 36.

Through resistor 37, which bypasses the contact 33 of the switch, the brightness control voltage can be applied to the kinescope at all times, yet the tuning indicator voltage can be superposed thereon.

In operation, the brightness control is preferably adjusted at or near cutoff so that the screen is dark or nearly dark. Then the switch is closed on contact 30 and the tuning element 40 of the oscillator and/or the RF stage is manipulated to seek the center tuning position to produce maximum voltage at the output of filter 6. When optimum tuning has been reached, maximum voltage appears across tank 20, maximum direct current voltage appears across load resistor 27 and maximum voltage in a positive direction is applied to grid 10. The general illumination of the screen 13 varies markedly near correct tuning to clearly visually indicate the peak voltage at the output of filter 6. The brightness control of the television receiver serves as a sensitivity control for the tuning indicator. When optimum tuning is obtained, switch 31 is returned to contact 33 and the brightness control is thereafter manipulated by the operator for most pleasing visual effect.

It is contemplated, according to this invention, to mechanically link the tuning control of tuning element 40 with the switch 31, as suggested by the dotted line 41. This mechanical link may comprise many physical embodiments. For example, the tuning knob could be connected through a slip clutch to bias armature 31 to contact 30 during the time the tuning knob is rotated. Alternatively, the switch 31 could be shifted by manually depressing or pushing on the turning knob. Such mechanical details are well within the skill of those familiar with this art and are not shown or claimed per se.

While I have described above the principles of my invention in connection with specific apparatus, it is to be clearly understood that this description is made only by way of example and not as a limitation to the scope of my invention.

What is claimed is:

1. A television receiver comprising: a tuned broad band-pass amplifier arranged to amplify both video and audio signals and having an output circuit; a video detector having an input circuit coupled to said output circuit of said amplifier and having an output circuit; a picture tube having a pair of video input electrodes, one of said electrodes being coupled to said output circuit of said video detector; a source of direct current bias voltage; a bias circuit connecting said source of bias voltage and the other of said electrodes; means in said bias circuit arranged selectively to vary the bias voltage applied to said electrodes thereby to control the brightness of said tube; a tuned circuit directly coupled to said broad band-pass amplifier output circuit and receiving both said video and audio signals, said tuned circuit comprising means for providing a maximum output signal responsive to optimum tuning of said amplifier; rectifier means coupled to said tuned circuit for rectifying the output signal thereof; and means coupling said rectifier means to said bias circuit whereby a direct current signal responsive to said output signal of said tuned circuit is superimposed on said direct current bias voltage thereby to cause maximum tube brightness in response to optimum tuning of said amplifier circuit.

2. A television receiver comprising: a tuned broad band-pass amplifier arranged to amplify both video and audio signals and having an output circuit; a video detector having an input circuit coupled to said output circuit of said amplifier and having an output circuit; a picture tube having a pair of video input electrodes, one of said electrodes being coupled to said output circuit of said video detector; a source of selectively variable direct current bias voltage; a bias curcuit including a resistance connecting said source of bias voltage and the other of said electrodes thereby to control the brightness of said tube; a tuned circuit directly coupled to said broad band-pass amplifier output circuit and receiving both said video and audio signals, said tuned circuit comprising means for providing a maximum output signal at a frequency adjacent one of the limit frequencies of said amplifier; and rectifier means coupled to said tuned circuit for rectifying the output signal thereof, said rectifying means including a load circuit for developing a direct current signal responsive to said output signal of said tuned circuit, said rectifying means load circuit being coupled to said bias circuit resistance whereby said direct current signal is superposed on said direct current bias voltage thereby to cause maximum tube brightness in reponse to optimum tuning of said amplifier circuit.

3. A television receiver comprising: a tuned broad band-pass amplifier arranged to amplify both video and audio signals and having an output circuit; a video detector having an input circuit coupled to said output circuit of said amplifier and having an output circuit; a picture tube having a pair of video input electrodes, one of said electrodes being coupled to said output circuit of said video detector; a source of direct current bias voltage; a bias circuit connecting said source of bias voltage and the other of said electrodes; means in said bias circuit arranged selectively to vary the bias voltage applied to said electrodes thereby to control the brightness of said tube; a tuned circuit directly coupled to said broad band-pass amplifier output circuit and receiving both said audio and video signals, said tuned circuit comprising means for providing a maximum output signal responsive to optimum tuning of said amplifier; rectifier means coupled to said tuned circuit for rectifying the output signal thereof; means coupling said rectifier means to said bias circuit whereby a direct current signal responsive to said output signal of said tuned circuit is superimposed on said direct current bias voltage thereby to cause maximum tube brightness in response to optimum tuning of said amplifier; and switch means in said coupling circuit and arranged selectively to disconnect the same from said bias circuit whereby said tube brightness is controlled solely in response to said means for selectively varying said bias voltage.

4. A television receiver comprising: a tuned broad band-pass amplifier arranged to amplify both video and audio signals and having an output circuit; a video detector having an input circuit coupled to said output circuit of said amplifier and having an output circuit; a picture tube having a pair of video input electrodes, one of said electrodes being coupled to said output circuit of selectively variable said video detector; a source of direct current bias voltage; a bias circuit connecting said source of bias voltage and the other of said electrodes thereby to control the brightness of said tube; a tuned circuit directly coupled to said broad band-pass amplifier output circuit and receiving both said video and audio signals, said tuned circuit comprising means for providing a maximum output signal responsive to optimum tuning of said amplifier; rectifier means coupled to said tuned circuit for rectifying the output signal thereof; said bias circuit having a resistance in series therewith; a load resistance connected in circuit with said rectifier means and having a direct current voltage developed thereacross responsive to said output signal of said tuned circuit; and switch means having a first position connecting said rectifier means load resistance across said source of bias voltage and said bias circuit resistance so that said direct current voltage developed across said load resistance is superposed on said direct current bias voltage thereby to cause maximum tube brightness in response to optimum tuning of said amplifier, said switch means having a second position shorting said bias circuit resistance whereby said tube brightness is controlled solely in response to said means for selectively varying said bias voltage.

References Cited in the file of this patent

UNITED STATES PATENTS

| | | |
|---|---|---|
| 2,173,173 | Lewis | Sept 19, 1939 |
| 2,180,944 | Linsell | Nov. 21, 1939 |

UNITED STATES PATENT OFFICE

CERTIFICATE OF CORRECTION

Patent No. 2,905,759 September 22, 1959

Eugene P. Hoyt

It is hereby certified that error appears in the printed specification of the above numbered patent requiring correction and that the said Letters Patent should read as corrected below.

Column 4, line 28, strike out the words "selectively variable"; line 29, before "direct" insert -- selectively variable --.

Signed and sealed this 22nd day of March 1960.

(SEAL)
Attest:

KARL H. AXLINE
Attesting Officer

ROBERT C. WATSON
Commissioner of Patents